Patented Mar. 29, 1932

1,851,104

UNITED STATES PATENT OFFICE

HANS LECHER, OF LEVERKUSEN/RHINE, AND ALBERT KOCH, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF POLYMERIZING BUTADIENE HYDROCARBONS IN THE EMULSIFIED STATE

No Drawing. Application filed March 7, 1929, Serial No. 345,219, and in Germany March 17, 1928.

The present invention relates to a process of polymerizing butadiene hydrocarbons in the emulsified state.

It is known that butadiene hydrocarbons, such as butadiene-(1.3), isoprene, 2.3-dimethylbutadiene-(1.3) and the like can be polymerized by emulsifying the hydrocarbons in aqueous solutions of suitable emulsifying agents and causing polymerization to take place, for example, by shaking or stirring these emulsions at normal or slightly elevated temperatures.

We have found, that the manufacture of butadiene hydrocarbons in water is facilitated and the stability of the emulsions is raised, when preparing the same in the presence of both a water soluble emulsifying agent and an emulsifying agent which is soluble in the hydrocarbon to be polymerized. As water soluble emulsifying agents may be mentioned by way of example soaps, alkali metal salts of bile acids, water soluble salts of alkylated naphthalene sulfonic acids and the like. Butadiene hydrocarbon soluble emulsifying agents are, for example, aluminum- or alkali earth metal salts of palmitic acid, oleic acid, stearic acid or other higher fatty acids, etc.

An aqueous solution of a water soluble emulsifying agent emulsifies the butadiene hydrocarbon, yielding an emulsion with the hydrocarbon in dispersed phase. A solution of an emulsifying agent which is soluble in a butadiene hydrocarbon emulsifies water, whereby an emulsion with water in dispersed phase is formed. Now, when emulsifying the aqueous solution of the water soluble emulsifying agent with that of the butadiene hydrocarbon soluble emulsifying agent in a butadiene hydrocarbon, there are easily formed stable emulsions with the water or the hydrocarbon as the dispersed phase depending on the quantities of the particular emulsifying agents used.

If desired, our emulsion may be homogenized before polymerization in any desired manner, for example, by forcing them through small apertures.

The emulsions thus obtainable yield polymerization products according to the usual methods, for example, by shaking at normal or elevated temperature, in a good yield considerably surmounting in many cases, especially when the hydrocarbon is in dispersed phase, the yield which is obtainable according to the methods hitherto known. A further advantage of our new process is, that worthless by-products, such as terpene-like compounds are not formed either during the emulsifying or during the polymerization process.

The following examples illustrate our invention, without limiting it thereto, the parts being by weight:

*Example 1.*—75 parts of an aqueous solution of sodium oleate of 10% strength and a solution of 2.5 parts of magnesium oleate in 50 parts of butadiene-(1.3) are caused to form an emulsion by shaking or stirring the mixture in a closed vessel. Polymerization is then performed by heating the emulsion to 60° C. for about 6 days. A latex like mass is thus obtained yielding a rubber like coagulate for example, by acidifying, in an excellent yield. By vulcanizing this coagulate a product of valuable technical properties is obtained.

Similar results will be obtained, when replacing the butadiene-(1.3) by 50 parts of isoprene.

*Example 2.*—100 parts of an aqueous solution of sodium stearate of 7% strength are emulsified with 70 parts of 2.3-dimethylbutadiene-(1.3) containing in solution 3 parts of magnesium oleate by stirring the mixture in a closed vessel. Polymerization is then performed by heating the emulsion to 70° C. for about 5 days, while continually shaking. A latex like cream is thus obtained in a nearly quantitative yield, yielding a rubber like mass by coagulation and washing.

*Example 3.*—100 parts of an aqueous sodium oleate solution of 10% strength are emulsified with 50 parts of butadiene-(1.3) and 5 parts of aluminium stearate by shaking the mixture in an autoclave. Polymerization is performed by heating the emulsion to about 60° C. for about 6 days, while continually shaking. From the latex-like mass thus formed a coagulate is obtainable in an excellent yield by freezing out and washing.

*Example 4.*—A mixture of 100 parts of an aqueous sodium oleate solution of 10% strength, 5 parts of normal caustic soda solution, 3.5 parts of magnesium oleate and 60 parts of butadiene-(1.3) is emulsified by shaking in a closed vessel. The emulsion thus formed is homogenized in a homogenizer of any desired kind and then polymerized by heating to about 60° C. for about 3 days without shaking or stirring. A quantitative yield of a latex like mass is thus obtained yielding a coagulate by freezing out.

In all the examples the yields of polymerization products are considerably better than the yields obtainable according to the same methods but without the addition of a butadiene hydrocarbon soluble emulsifying agent.

We claim:—

1. A process which comprises emulsifying a butadiene hydrocarbon in water in the presence of both an emulsifying agent which is soluble in water and an emulsifying agent which is soluble in the butadiene hydrocarbon and then polymerizing the butadiene hydrocarbon.

2. A process which comprises emulsifying a compound of the group consisting of butadiene-(1.3), isoprene and 2.3-dimethylbutadiene-(1.3) in water in the presence of both an emulsifying agent which is soluble in water and an emulsifying agent which is soluble in the said compound and then polymerizing said compound.

3. A process which comprises emulsifying a butadiene hydrocarbon in water in the presence of both an emulsifying agent which is soluble in water and an emulsifying agent which is soluble in the butadiene hydrocarbon, homogenizing the emulsion and then polymerizing the butadiene hydrocarbon.

4. A process which comprises emulsifying a compound of the group consisting of butadiene-(1.3), isoprene and 2.3-dimethylbutadiene-(1.3) in water in the presence of both an emulsifying agent which is soluble in water and an emulsifying agent which is soluble in the said compound, homogenizing the emulsion and then polymerizing the butadiene hydrocarbon.

In testimony whereof we have hereunto set our hands.

HANS LECHER. [L. S.]
ALBERT KOCH. [L. S.]